United States Patent [19]

Janssen

[11] 3,979,845

[45] Sept. 14, 1976

[54] VISIBLE INDEX SYSTEMS

[75] Inventor: Alexander Patton Janssen, Charlottesville, Va.

[73] Assignee: Datastrip Corporation, Charlottesville, Va.

[22] Filed: Apr. 14, 1975

[21] Appl. No.: 567,852

Related U.S. Application Data

[60] Continuation of Ser. No. 403,986, Oct. 5, 1973, abandoned, which is a division of Ser. No. 188,743, Oct. 13, 1971, Pat. No. 3,778,914.

[52] U.S. Cl. .............................. 40/64 R; 40/104.18

[51] Int. Cl.[2] ........................ G09F 1/00; B32B 3/10

[58] Field of Search ............ 40/63 R, 64 R, 65, 102, 40/104.02, 104.17–104.19, 152.1, 78, 2 R, 135; 281/33

[56] References Cited

UNITED STATES PATENTS

| | | | |
|---|---|---|---|
| 671,097 | 4/1901 | Templeton | 40/63 R |
| 1,589,556 | 6/1926 | Rand | 40/63 R |
| 1,695,328 | 12/1928 | Gordon et al. | 40/104.19 |
| 2,169,488 | 8/1939 | Gast, Jr. | 40/63 R X |
| 2,529,926 | 11/1950 | Downs | 40/64 R X |
| 2,567,705 | 9/1951 | Hall | 40/64 R |
| 2,966,753 | 1/1961 | Martin | 40/64 R |
| 3,335,509 | 8/1967 | Braxton | 40/64 R X |
| 3,544,134 | 12/1970 | Sibley | 281/33 |
| 3,547,752 | 12/1970 | Janssen | 40/64 R X |
| 3,669,555 | 6/1972 | Holes et al. | 40/104.18 X |

*Primary Examiner*—Louis G. Mancene
*Assistant Examiner*—John H. Wolff
*Attorney, Agent, or Firm*—Strauch, Nolan, Neale, Nies & Kurz

[57] ABSTRACT

A visible index system including a panel, inserts removably attachable to the panel, and labels on which information can be typed or otherwise imprinted, provision being made for attaching the labels to the inserts.

11 Claims, 5 Drawing Figures

VISIBLE INDEX SYSTEMS

This application is a continuation of application Ser. No. 403,986 filed Oct. 5, 1973 (now abandoned). The latter is a division of application Ser. No. 188,743 filed Oct. 13, 1971, (now U.S. Pat. No. 3,778,914).

The invention relates to index systems and, more particularly, to novel, improved, visible index systems.

In my U.S. Pat. No. 3,547,752, issued Dec. 15, 1970, I describe briefly a visible index system in which flexible, strip-like inserts are detachably fixed to support members or panels by engaging inwardly extending flanges at opposite sides of the panels in recesses formed in the ends of the inserts. My issued patent deals more specifically with a relatively rigid assemblage from which individual inserts can be separated as necessary and which is kerfed or scored so that it can be fed through a typewriter or the like to imprint letters and other symbols on the inserts.

I have now found that there are many applications of my novel visible index systems where plural inserts bearing identical information are needed. As a single example, my visible index systems have been found particularly useful by banks to provide tellers with readily accessible, up-to-date information on overdrawn accounts, stolen checks, stop payment orders, cashing privileges, etc. The same information, carried by duplicate inserts, must be made available to a number of tellers in this application of my system.

It is the primary object of the present invention to provide novel, improved visible index systems of the general character just described which are so constructed that the index strips may be more expeditiously provided with the desired information in applications where the same information is needed on more than one insert.

Generally speaking, I accomplish the foregoing and other important objectives of my invention by applying an adhesive to the exposed surfaces of the inserts and by applying the requisite information to labels which can then be fixed to the inserts by the adhesive. The labels are preferably supplied in pads of carbonless copy paper so that a number of duplicate labels can be simultaneously prepared. The sheets in the pad are perforated at appropriate intervals so that the finished labels can be detached and fixed to the inserts.

As indicated above, one advantage of this novel construction is that it significantly facilitates the preparation of inserts in applications where duplicate inserts are needed. Other advantages of the present invention are: (a) a large information capacity in that a number of insert supporting panels can be easily incorporated in a loose-leaf binder type of arrangement; (b) the inserts are readily replaceable; and (c) the inserts and labels are inexpensive and can simply be thrown away as the information on them becomes outdated and they are replaced.

Thus, my novel visible index systems are considerably superior to those heretofore proposed and exemplified by that shown in U.S. Pat. No. 2,966,753 to Martin. The Martin and similar systems are characterized by limited information storage capacity, high cost, expense and difficulty in updating stored information to keep it current, etc.

The primary object and certain important advantages and features of the present invention have been described above. Other important objects and features and further advantages of the invention will become apparent from the appended claims and as the ensuing detailed description and discussion proceeds in conjunction with the accompanying drawing, in which:

Figure 1:
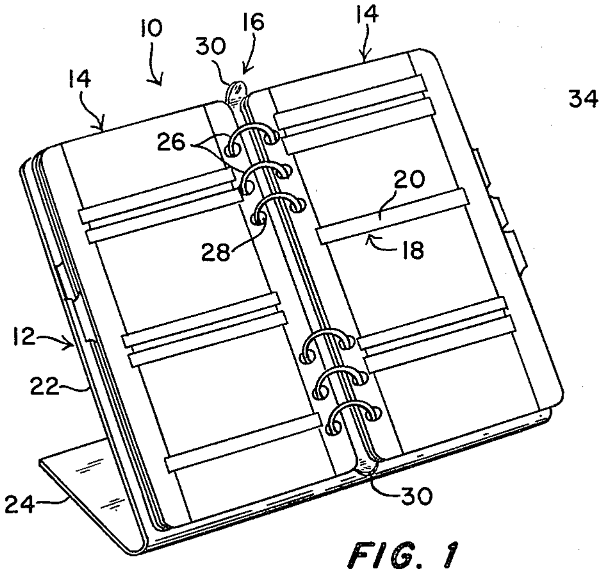
FIG. 1 is a pictorial view of a visible index system in accord with the principles of the present invention.

Referring now to the drawing, FIG. 1 depicts an exemplary visible index system 10 embodying and constructed in accord with the principles of the present invention. The main components of system 10 are a panel support or stand 12, a plurality of page-like panels 14 detachably fixed to support 12 by a ring-type binder system 16 incorporated in the latter; and one or more detachable index strips or inserts 18 affixed to each of the panels 14 and carrying a label 20 on which desired information is typed or otherwise imprinted.

Support 12, which is typically fabricated of sheet metal, includes a flat, large area body 22. A base 24, integrally formed at the lower edge of body 22, supports the latter in an inclined position, making the information carried by labels 20 readily accessible.

The binder arrangement 16 is fixed to the middle of support body 22 in a generally vertical orientation. The binder arrangement is of conventional construction and will accordingly not be described in detail herein. Briefly, however, it includes a series of vertically spaced apart, loop-type retainers 26. The retainers are adapted to extend through similarly spaced apertures 28 adjacent the inner margins of panels 14 to affix the panels to support 12. The retainers can be opened for the insertion or replacement of panels by depressing one of the conventional operators 30 and closed to retain the panels in place by elevating the operating levers.

As is apparent from FIG. 1, the arrangement just described provides a visible index system of high capacity and ready accessibility. A number of panels 14 can be assembled to one support 12, and the panels can be easily transferred from one side of support body 22 to the other to expose the inserts on which the desired information is carried by labels 20.

Figure 2:
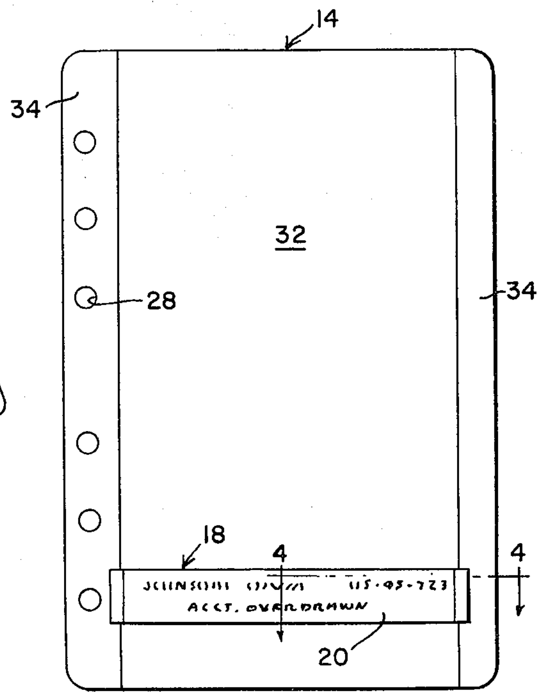
FIG. 2 is a plan view of a panel or insert support employed in the inex system of FIG. 1, with inserts removably fixed to the panel.

Referring now to FIG. 2, panels 14 include a main body 32, which may be made from any material of sufficient strength to provide structural integrity such as thin cardboard, plastic, etc. Elongated ribs or stiffeners 34 are attached to the marginal or peripheral portions of panel body 32 on both sides thereof as by an appropriate adhesive.

The adhesive is applied in such a fashion that it fixes only the outer portion of the stiffener to the body of the panel, leaving the innermost portions of the stiffeners free. Thus, the inner portions of the stiffeners constitute flanges 37 which are engageable with cooperating recesses 38 in the ends of inserts 18 (see FIG. 4) to removably fix the inserts to either or both sides of the panels.

Finally, as already mentioned above, aperatures 28 are formed in each panel adjacent the inner margin thereof so that the panel can be removably fixed to support 12 by binder mechanism 16.

Figure 3:
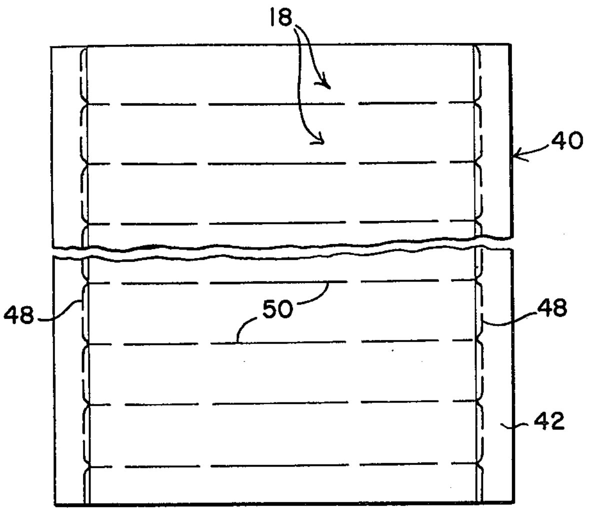
FIG. 3 is a plan view of an assemblage in which inserts of the type shown in FIG. 2 can be supplied.
Figure 4:
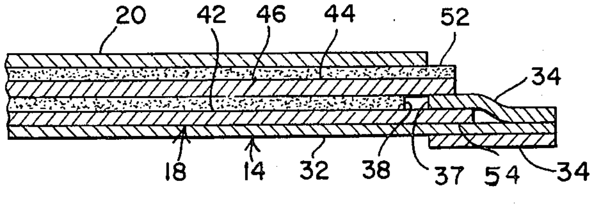
FIG. 4 is a section through FIG. 2, taken substantially along line 4—4 of the latter Figure.

Turning now to FIGS. 3 and 4, for purposes of convenience and manufacturing economy, inserts 18 are preferably made up in multiples in an assemblage 40 which typically includes a first back ply or sheet 42 and a front ply or sheet 44. These plies are bonded together by an appropriate adhesive 46.

Two longitudinally extending score lines 48 are made through back layer 42 of assemblage 40 adjacent the margins thereof. These score lines are connected by transversely extending, spaced apart, score lines 50 through both layers or plies 42 and 44 of the assemblage. The cooperating score lines 48 and 50 segment the assemblage into inserts 18 and make the inserts readily removable from the assemblage.

As shown in both FIGS. 3 and 4, the edge portions of the top insert assemblage ply 44 terminate short of score lines 48. The edge portions and score lines both lie laterally beyond the edges of adhesive layer 46. This arrangement produces the recesses 38 in the ends of the inserts 18.

Turning now to FIG. 4, an adhesive layer 52 is formed on the exposed surface of the top or outermost ply 44 of assemblage 40. The adhesive in this layer, which may be of the moisture- (or pressure-) sensitive type, is utilized to attach the labels 20 to the inserts 18 after the requisite information has been typed or otherwise imprinted in the labels.

The plies of the insert assemblage can be formed from any desired type of material which is flexible and has structural integrity. The stiffer weights of paper, thin cardboard, and various synthetics are all suitable.

The inserts are removably fixed to panels 14 by flexing them so that the lower end portions 54 of the inserts provided by ply 42 can slide under the flanges 37 at the opposite sides of panels 14. The inserts are then released, allowing them to return to their original, flat configuration and engage the flanges 37 in recesses 38 to retain the inserts in place. When desired, the inserts can be removed by reversing the process.

Figure 5:
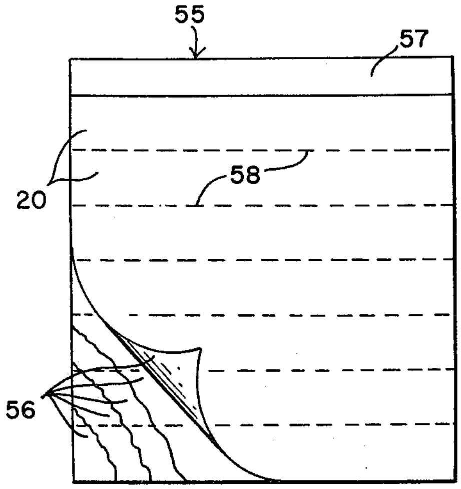
FIG. 5 is a plan view of a pad in which labels of a type utilized in the system of FIG. 1 can be supplied.

Turning next to FIG. 5, labels 20 are preferably supplied as multiple sheet pads 55 of NCR carbonless copy paper to avoid smearing although pads with interleaved carbon paper can be employed if desired. The sheets 56 are bound together at one marginal edge 57 of the pad and perforated at locations indicated by transversely extending lines 58 so that the labels 20 can be easily separated from the pad.

The arrangement just described enables a plurality of duplicate labels to be simultaneously prepared in a typewriter or by other method of imprinting information on them. The labels can then be readily separated from the pads, the adhesive on the inserts moistened, and the labels attached to the inserts. This can be done before or after the inserts are fixed to the supporting panels 14.

As will be apparent from the foregoing, both the labels and inserts are fabricated from relatively inexpensive materials, only relatively small quantities of which are required. Furthermore, the inserts and labels are manufactured by a relatively simple process; and the number of steps involved is small. Accordingly, the inserts and the attached labels can simply be discarded and replaced when the information on the labels becomes obsolete.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A visible index system, comprising: a panel; an elongated insert; means for detachably affixing said insert to said panel; an adhesive free label having an information receiving surface; a means for attaching said label to said insert, said last-mentioned means being an adhesive layer on the exposed surface of the insert whereby the desired information can be placed on said label and said label then attached to said insert; and panel support means which includes a support member and a plurality of loop-type retainers fixed to said support member in aligned, spaced apart relationship and at locations between and spaced from the sides of said member, there being apertures in said panel opposite one edge thereof in the same aligned and spaced relationship relative to each other as are the retainers and said retainers extending through said apertures, whereby said panel can be assembled on and selectively displaced from one side of the supporting member to the other to expose selected one of the labels fixed to the panel by the inserts to which the labels are attached.

2. The visible index system of claim 1, wherein the insert is affixable to the panel by co-operating means which include parallel, facing flanges at opposite edges of said panel and recesses in the ends of the insert, the flanges on the panel being engageable in said recesses.

3. The visible index system of claim 2, wherein said insert is of multi-ply construction, wherein the plies are bonded together by an adhesive, and wherein the plies extend beyond the adhesive at both ends of the insert, thereby producing the recesses in the ends of the insert.

4. The visible index system of claim 2, wherein said panel comprises a main body member and reinforcing strips at the opposite edges of said main body member on at least one side thereof, the outer edge portions of said strips being fixed to the main body member to secure said strips thereto and the inner edge portions being free of attachment to said main body member and thereby providing the insert engageable flanges of the panel.

5. The visible index system according to claim 1, which includes a plurality of panels constructed and attached to said support member as hereinbefore defined.

6. A visible index system, comprising: a panel; a plurality of elongated inserts; means for detachably affixing said inserts to said panel which includes parallel, facing flanges at opposite edges of said panels, said inserts being made of a thin flexible material and being of elongated rectangular configuration and sufficiently long to span the panel and the flanges on the panel being engageable with said inserts to removably affix the inserts to the panel with a surface of each insert exposed; adhesive free labels having information receiving surfaces; means for attaching said labels to said inserts, said last-mentioned means being an adhesive layer on the exposed surface of each said insert, whereby the desired information can be placed on a label and the label then attached to an insert; and panel support means which includes a support member and means for so fixing said panel to said support member that said panel can be displaced relative to the support member.

7. A visible index system, comprising: a panel; a plurality of elongated inserts; means for detachably affixing each said insert to a selected one of the two sides of the panel which includes parallel, facing flanges at opposite edges of said panels and on both sides thereof and recesses in the ends of said inserts, said inserts being made of a thin flexible material and being of elongated rectangular configuration and sufficiently long to span the panel and the flanges on the panel being engageable in said recesses to removably affix the inserts to the panel with the surfaces of the inserts exposed; adhesive free labels having information receiving surfaces; means for attaching said labels to said inserts, said last-mentioned means being an adhesive layer on the exposed surface of each said insert, whereby the desired information can be placed on a label and said label then attached to an insert; and panel support means which includes a support member and a plurality of loop-type retainers fixed to said support member in aligned, spaced apart relationship and at locations between and spaced from the sides of said member, there being apertures in said panel opposite one edge thereof in the same aligned and spaced relationship relative to each other as are the retainers and said retainers extending through said apertures, whereby said panel can be assembled on and selectively displaced from one side of the supporting member to the other to expose selected ones of the labels fixed to the panel by the inserts to which the labels are attached.

8. A visible index system, comprising: a panel; an elongated insert; means for detachably affixing said insert to said panel; an adhesive free label having an information receiving surface, said label being a segment of a bound assemblage of superimposed sheets of copy paper, there being a series of transversely extending, spaced apart lines of perforations in said sheets, whereby information can be simultaneously imprinted on the corresponding segments of the several sheets of said assembly and said segments thereafter detached from said assembly; a means for attaching said label to said insert, said last-mentioned means being an adhesive layer on the exposed surface of the insert whereby the desired information can be placed on said label and said label then attached to said insert; and panel support means which includes a support member and a plurality of loop-type retainers fixed to said support member in aligned, spaced apart relationship and at locations between and spaced from the sides of said member, there being apertures in said panel opposite one edge thereof in the same aligned and spaced relationship relative to each other as are the retainers and said retainers extending through said apertures, whereby said panel can be assembled on and selectively displaced from one side of the supporting member to the other to expose selected one of the labels fixed to the panel by the inserts to which the labels are attached.

9. A visible index system, comprising: a panel; an elongated insert, said insert being a segment of an assemblage comprising a first sheet of thin, flexible material, said sheet being divided by a series of transversely extending, weakened lines into a plurality of separable, elongated, rectangular segments; a second sheet of material adhesively fixed to the first sheet, said second sheet being weakened along the same lines as said first sheet for separation therewith; and a coating of adhesive on the exposed surface of the second sheet; means for detachably affixing said insert to said panel; an adhesive free label having an information receiving surface; a means for attaching said label to said insert, said last-mentioned means being an adhesive layer on the exposed surface of the insert whereby the desired information can be placed on said label and said label then attached to said insert; and panel support means which includes a support member and a plurality of loop-type retainers fixed to said support member in aligned, spaced apart relationship and at locations between and spaced from the sides of said member, there being apertures in said panel opposite one edge thereof in the same aligned and spaced relationship relative to each other as are the retainers and said retainers extending through said apertures, whereby said panel can be assembled on and selectively displaced from one side of the supporting member to the other to expose selected one of the labels fixed to the panel by the inserts to which the labels are attached.

10. A visible index system, comprising: a panel; an elongated insert; means for detachably affixing said insert to said panel; an adhesive free label having an information receiving surface, said label being of a material on which the desired information can be entered by a multiple copy producing type of process; a means for attaching said label to said insert, said last-mentioned means being an adhesive layer on the exposed surface of the insert whereby the desired information can be placed on said label and said label then attached to said insert; and panel support means which includes a support member and a plurality of loop-type retainers fixed to said support member in aligned, spaced apart relationship and at locations between and spaced from the sides of said member, there being apertures in said panel opposite one edge thereof in the same aligned and spaced relationship relative to each other as are the retainers and said retainers extending through said apertures, whereby said panel can be assembled on and selectively displaced from one side of the supporting member to the other to expose selected one of the labels fixed to the panel by the inserts to which the labels are attached.

11. A visible index system, comprising: a panel; a rectangular insert support means having parallel facing flanges at opposite edges thereof; a plurality of elongated rectangular inserts of a thin, flexible material, each of said inserts being of sufficient length to span the support means, each said insert having recesses at the ends thereof and the flanges on the insert support means having means for selectively engaging said recesses, respectively, so as to removably affix said inserts to said support means with one of the major surfaces of each said insert fully exposed; an adhesive free label having an information receiving surface of generally the same width as the insert, said label being of a material on which the information can be entered by a multiple copy producing type of process; means for attaching said label to said insert, said last-mentioned means being an adhesive layer on the exposed surface of the insert; and panel support means which includes a support member and means for so fixing said panel to said support member that said panel can be displaced relative to the support member.

* * * * *